United States Patent [19]

Bradley

[11] 4,208,473
[45] Jun. 17, 1980

[54] BIPOLAR BATTERY

[75] Inventor: Thompson G. Bradley, Rochester, Mich.

[73] Assignee: General Motors Corporation, Detroit, Mich.

[21] Appl. No.: 47,363

[22] Filed: Jun. 11, 1979

[51] Int. Cl.² ............................................. H01M 6/42
[52] U.S. Cl. .................................. 429/112; 429/153; 429/210
[58] Field of Search ............... 429/112, 152, 153, 154, 429/210

[56] References Cited

U.S. PATENT DOCUMENTS

| 2,081,926 | 6/1937 | Gyuris | 429/102 |
| 2,620,369 | 12/1952 | Daniel | 429/154 |
| 2,968,686 | 1/1961 | Duddy | 429/153 |
| 3,170,820 | 2/1965 | Drengler et al. | 264/104 |
| 4,119,769 | 10/1978 | Schneider et al. | 429/112 |

OTHER PUBLICATIONS

Argonne National Laboratory Report ANL-7775, Apr. 1971, pp. 131–132.

Primary Examiner—Donald L. Walton
Attorney, Agent, or Firm—Lawrence B. Plant

[57] ABSTRACT

A secondary bipolar battery including a conductive intercell barrier having a tortuously-pathed (e.g., finned) peripheral portion outboard the cells to reduce parasitic current flow between adjacent cells around the periphery of the barrier. The battery's end electrodes have greater reactant content than the intermediate electrodes to compensate for parasitic losses. A Li/-FeS$_2$ example is detailed.

5 Claims, 6 Drawing Figures

BIPOLAR BATTERY

BACKGROUND OF THE INVENTION

This invention relates to unflooded bipolar batteries of the immobilized-electrolyte type, and more particularly, to such batteries where several unsealed cells are stacked together in an inert gas filled housing.

Bipolar batteries offer the advantages of high specific power and high specific energy due to their low internal electrical resistance and uniform current distribution. Bipolar batteries, however, are particularly vulnerable to unwanted, wasteful side reactions occurring between adjoining cells resulting from the formation of a continuous film (i.e., only a few micrometers thick) of electrolyte over the external surface of the cell stack. Unless protective measures are taken, such a film can form an ionic bridge between the electrodes of opposite polarity in adjacent cells in the stack and thereby promote unwanted side reactions between those electrodes. Such reactions nonusefully consume the batteries' active materials and drastically shorten the useful life of the battery.

Some have sought to avoid these unwanted intercell reactions by providing insulating seals around the periphery of each cell to ionically isolate the reactive innards thereof from the cell bridging film. Others have encircled the reactive innards with a material which is not wetted by electrolyte, and hence, disrupts the continuity of the film. Such insulating seals and/or nonwettable film disrupters add undesirable weight and complexity to the battery. Moreover, such seals and disrupters are susceptible to deleterious chemical and physical attack. Their ability to withstand such attack materially affects the life and reliability of the batteries in which they are used and once their integrity is broken, the batteries' capcity (i.e., amp-hrs) is rapidly lost. BN, for example, has been used as a seal/film disrupter material in high temperature (i.e., 425° C.), Li bipolar batteries (i.e., Li-Se). The BN not only adds weight to the cell but has been found to be difficult to bond to other components of the battery structure and slowly loses its nonwetting properties with time.

More recently, efforts have been made to reduce the size and weight of the intercell insulating seals. These efforts, however, have been at the expense of increased internal electrical resistance due to constricted current paths and nonuniform current distributions throughout the cell stack.

It is an object of the present invention to eliminate insulating seals and film disrupters in bipolar batteries without comprising internal electrical resistance or current distribution while at the same time maintaining high levels of capacity throughout the useful life of the battery. This and other objects and advantages of the present invention will become more readily apparent from the description thereof which follows.

BRIEF DESCRIPTION OF THE INVENTION

The present invention comprehends accepting low levels of the unwanted intercell reactions promoted by the continuous electrolyte film on the external surfaces of the battery stack (hereafter "surface loss"), but compensating therefore by providing the end cells in the stack with electrodes having a greater capacity for the cells' reactants than electrodes of the same polarity in the intermediate cells of the stack. More specifically, this invention comprehends providing means between the several cells for reducing the rate of the unwanted reactions to within acceptable limits and to provide reservoirs, as it were, in the end cells of the battery containing sufficient excess reactant capacity to compensate for the surface losses and to maintain the design capacity of the battery throughout its intended useful life. In accordance with the present invention, unflooded (i.e., not immersed in free electrolyte), bipolar batteries are made by stacking a plurality of unsealed, immobilized electrolyte type cells together within a housing containing an atmosphere which is chemically and electrochemically inert to the cells' active ingredients, electrolyte and materials of construction. The several cells are stacked in end-to-end fashion so as to be electrically series connected yet separated ionically, one from the other, by means of an ion impervious, electronically conductive barrier contiguous to the electrodes of opposite polarity in adjacent cells. The barrier includes a surface-loss-suppressing peripheral portion which extends outboard of (i.e., beyond) the peripheries of the cells themselves as defined by the boundaries of the reactive innards. The surface-loss-suppressing peripheral portion includes means to greatly extend the length of the electrolyte film passing around the barrier in the direction of cell stacking and between the opposite polarity electrodes of adjacent cells contiguous to the barrier. The increased length increases the electrical resistance of the film and reduces the rate of surface loss therethrough. The positive electrode at one end of the stack and the negative electrode at the other end of the stack are larger (i.e, have greater capacity) than electrodes of like polarity intermediate the end electrodes. This in effect then provides reservoirs at each end of the battery for supplying the excess amount of reactants needed to accommodate the surface losses for a predetermined length of time. Hence, the end electrodes are so sized as to have sufficient excess reactant capacity (i.e, over that of the intermediate electrodes) to offset whatever surface losses are permitted over the intended life of the battery, and hence, serve to forestall loss of battery capacity during that period.

DETAILED DESCRIPTION OF ONE EMBODIMENT OF THE INVENTION

The invention can better be understood in the context of a specific application thereof. By way of example then, the invention is hereafter discussed in the context of a Li/fused salt/FeS$_2$ bipolar battery system.

Figure 1:
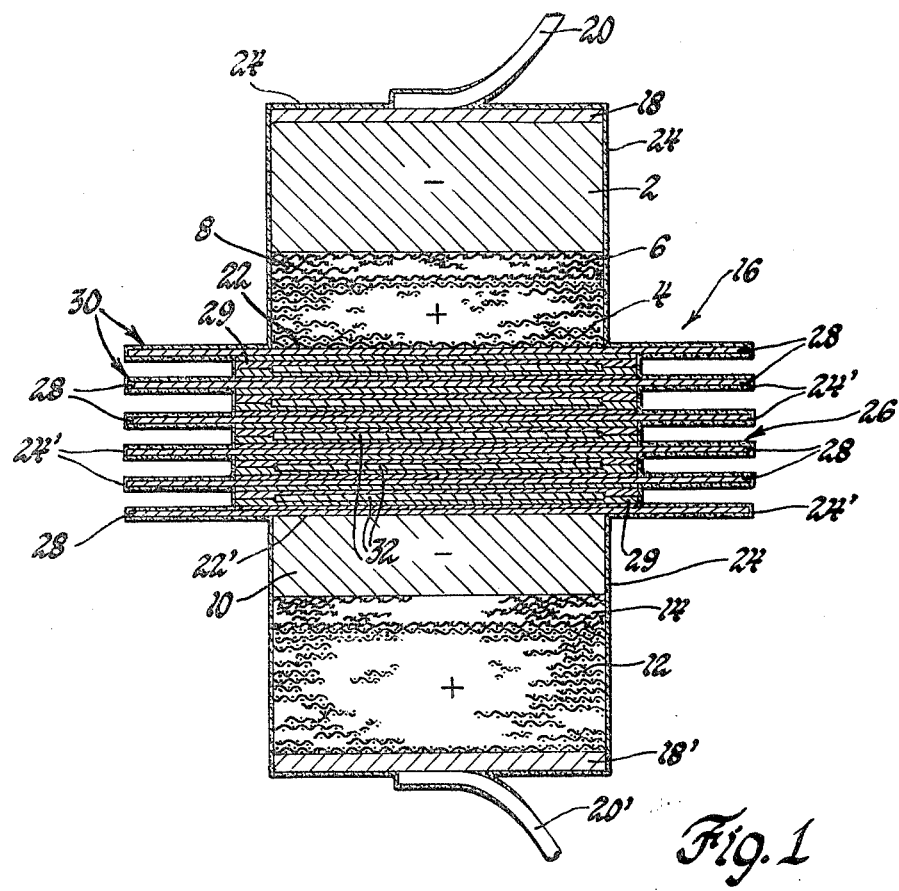
FIG. 1 illustrates a sectioned, side elevational view through the center of a cylindrically-shaped, two-cell Li-FeS$_2$ bipolar battery made according to the invention hereof.

In the Li/fused salt/FeS$_2$ system electric current is generated by the overall reaction:

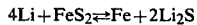

wherein Li+ is transported back and forth between electrodes within each cell during charging and discharging of the cell and between cells through the surface film on the cell stack. Lithium ions lost to the next adjacent cell due to transport through the surface film can never return to the electrodes from whence they came. The overall transfer mechanism through the surface film causes a buildup of lithium in the negative end of the battery while depleting the lithium from the positive end of the battery. The resultant imbalance in lithium inventory reduces the useable capacity of the battery. The present invention forestalls this condition for a predetermined period of time (i.e, see FIG. 6) by retarding the Li transfer rate through the surface film between adjacent cells and by providing excess lithium ion capacity in the donor (i.e, positive) and receptor (i.e, negative) electrodes in the end cells of the battery. Excess lithium ion capacity may be provided in a number of ways but in the drawings it is depicted merely as physically larger electrodes. If it is desired to assemble the battery in the charged state then the negative electrode (i.e., see 54 of FIG. 5) at the negative end of the battery should only be in a partially discharged state (i.e., has capacity to receive more Li) and the positive electrode (i.e, see 60 FIG. 5) at the positive end of the battery should be in a partially discharged state (i.e., contains some $Li_2S$) when all the other electrodes are in their fully charged state.

Upon standing, some surface losses occur between the positive electrode at the negative end of the battery and the negative electrode of the next adjacent cell. This consumes Li from that negative electrode and adds it to the positive electrode of the end cell. This same phenomenon occurs for each set of cells throughout the battery and a corresponding loss of capacity occurs unless the battery is recharged. On recharge, the Li is removed from the positive electrode and added to the negative electrode of the same cell. Hence, there has been a net transfer of Li from the positive electrode at the positive end of the battery to the negative electrode at the negative end of the battery. The Li needed to recharge the negative electrode at the positive end of the battery is supplied by the $Li_2S$ from the partially discharged positive electrode 60 at the positive end of the battery. Once the surface loss rate is determined, sufficient excess $Li_2S$ and iron is provided in the positive electrode 60 and sufficient capacity is provided in the negative electrode 54 to meet any desired mission requirement (i.e., years of service).

Preferably, the batteries are assembled in the discharged state. That is to say, with the negative electrodes (including the oversized negative 54) depleted of Li and the active material of the positive electrodes (including the oversized positive 60) consisting of $Li_2S$ and Fe. In this condition, the innards are the same for the end electrodes as for the intermediate electrodes, are less reactive to the atmosphere and have achieved most of their expansion. Moreover, when so assembled, the batteries have maximum shelf life. To put them into service they are heated and charged in the usual manner. This transfers all the Li from the positive electrode in the negative end cell to the negative electrode 54 thereof, but still leaves that negative electrode in a partially uncharged state, and hence, capable of consuming more Li. Similarly, the oversized positive electrode 60 in the positive end cell gives up some, but not all of its $Li_2S$ so that some remains to accommodate the surface loss effect.

Hence, any given battery design will be a compromise between the design of the means between cells for suppressing surface losses and the excess capacities of the end cells' electrodes needed to accomodate the surface losses.

More specifically and with more particular reference to the drawings:

FIG. 1 depicts an unenclosed, two-cell, bipolar lithium/iron disulfide ($Li/FeS_2$) battery constructed in accordance with the present invention. The upper cell of the battery comprises essentially a negative (i.e., Li electrode) electrode 2, a positive (i.e., $FeS_2$ electrode) electrode 4, and an electrolyte (i.e, fused salt) 6 therebetween. The Li electrode 2 may be of either the liquid or solid type as is well known in the art. Typical liquid lithium electrodes have the melt capillarily contained in a porous matrix and are typified by such U.S. Pat. Nos. as Craig 3,560,265 (issued Feb. 2, 1971) or Bradley et al 3,532,549 (issued Oct. 6, 1970). Typical solid lithium electrodes have the lithium alloyed with other metals such as aluminum or silicon. Likewise, the positive electrode 4 is made according to the conventional practice of dispersing iron disulfide particles throughout a porous conductive matrix which acts as a current collector. Examples of this are described in U.S. Pat. No. Dunning et al 4,053,978 (issued Oct. 18, 1977). Such electrodes are also saturated with electrolyte. The cell's electrolyte 6 is capillarily contained within a nonconducting porous, wettable matrix which typically comprises a laminate of boron nitride cloth layers 8 saturated with a fused salt, such as 28% LiF, 55% LiCl and 17% LiBr as is likewise well known in the art. In similar fashion, the lower cell comprises negative electrode 10, positive electrode 12 and electrolyte 14. These active innards (i.e., electrodes and electrolyte) are not sealed off or contained, but rather are completely exposed to the ambient atmosphere. The lithium capacity of the negative electrode 2 of the upper cell is greater (illustrated as larger in the drawings) than the Li capacity of the negative electrode 10 of the lower cell and acts to receive the excess Li transported by surface losses. Similarly, the lithium capacity of the positive electrode 12 of the lower cell is greater (illustrated as larger in the drawings) than the Li capacity of the positive electrode 4 of the upper cell. The excess Li capacities of the electrodes 2 and 12 will in most cases be the same as the former is naught but the sump for lithium migrating through the battery from the latter as a result of surface losses. The amount of excess capacity will vary with the overall cell design and the mission requirements of the battery, as well as the effectiveness of the surface-loss-suppressing peripheral portion of the intercell barrier. In this regard, an electronically conductive, ionically impervious barrier 16 electrically joins the positive electrode 4 of the upper cell to the negative electrode 10 of the lower cell while ionically isolating them and will be described in more detail hereinafter. Conductive plates 18 and 18' collect current from the end electrodes 2–12 while conductive leads 20 and 20' conduct the current out of the battery. Experience has shown that wetting forces ultimately cause a thin substantially continuous film of electrolyte 24 to cover all the outer surface of the battery. Such films 24 provide an ionically conductive path around the intercell barrier 16 and permit electrochemical reaction between the positive electrode 4 of the upper cell and the negative electrode 10 of the lower cell (i.e, surface loss). This surface loss nonusefully shunts the current producing capability of the electrodes 4 and 10 around the barrier 16.

Intercell barriers (e.g., #16) for the present invention have electrode-contiguous surfaces 22 and 22' and a peripheral portion 26 which extends outboard the periphery of the battery's electrochemically active innards and has a highly protracted surface formed in major part by the fins 30. The peripheral portion 26 of the barrier 16 substantially increases the length of the film 24' ionically bridging electrodes 4 and 10 thereby increasing the resistance of the film and suppressing the rate of surface loss between electrodes 4 and 10. In the particular embodiment shown in FIG. 1, the barrier 16 is constructed simply by stacking and bonding (i.e, with carbon cement) together a plurality of layers 28 of Grafoil®. The larger diameter layers 28 form the fins 30 while the smaller diameter layers 29 serve to space the larger diameter layers apart Grafoil is dense graphite sheet material which is chemically compatible with the cells' reactants. Spaced throughout the center of the Grafoil stack are several thin pieces of impermeable molybdenum foil 32 having a diameter about equal to that of the electrode diameters. The molybdenum insures complete ionic impermeability of the Grafoil stack. Barrier structures such as this (i.e., FIG. 1) are simple to make with various numbers of fins, and hence, convenient tools for demonstrating the effects of various film path lengths around the barrier on the rate of surface losses. They would not be practical, however, in a commercial battery. In this regard, intercell barriers so constructed are unnecessarily bulky and add to the internal electrical resistance of the battery. More practical batteries then would preferably include barriers constructed such as illustrated in FIGS. 2–5 which are lighter weight, consume less space and offer less electrical resistance to the flow of current therethrough from the barrier-contiguous electrodes 4 and 10.

Figure 2:
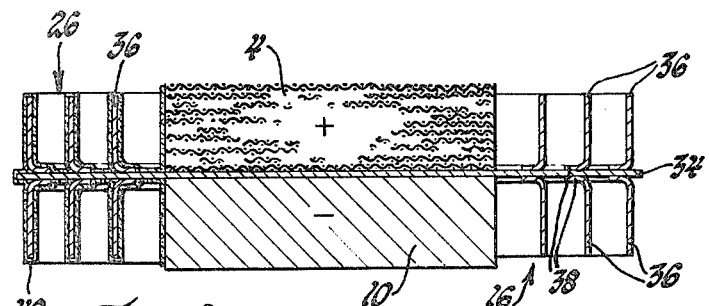
FIGS. 2–4 illustrate sectioned, side elevational views of intercell barriers and associated electrodes which are alternatives to that shown in FIG. 1.

FIG. 2 illustrates an intercell barrier 16 formed from a single impermeable sheet 34 having a peripheral portion 26 comprising a plurality of annular fins 36 extending perpendicularly and in opposite directions from the sheet 34 so as to curcumscribe the positive and negative electrodes. The bases of the annular fins 36 are provided with short inwardly projecting lips 38 for joining the fins 36 to the sheet 34. The nature/length of the electrolyte film 40 is illustrated on the left side of FIG. 2.

Figure 3:
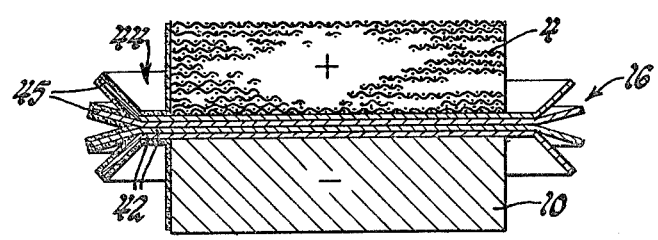

FIG. 3 illustrates another embodiment wherein the barrier 16 is formed from a laminate of impermeable conductive sheets 42 bonded together at their centers between the electrodes 4 and 10 and fanned out at its peripheral portion 44 to form the several fins 45.

Figure 4:
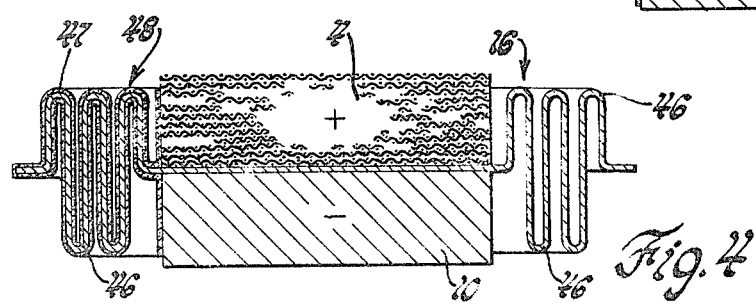

FIG. 4 is still another embodiment of a barrier 16 formed from a single impermeable sheet having its peripheral portion 48 corrugated to form the fins 46 for extending the film 47 between electrodes 4 and 10.

Figure 5:
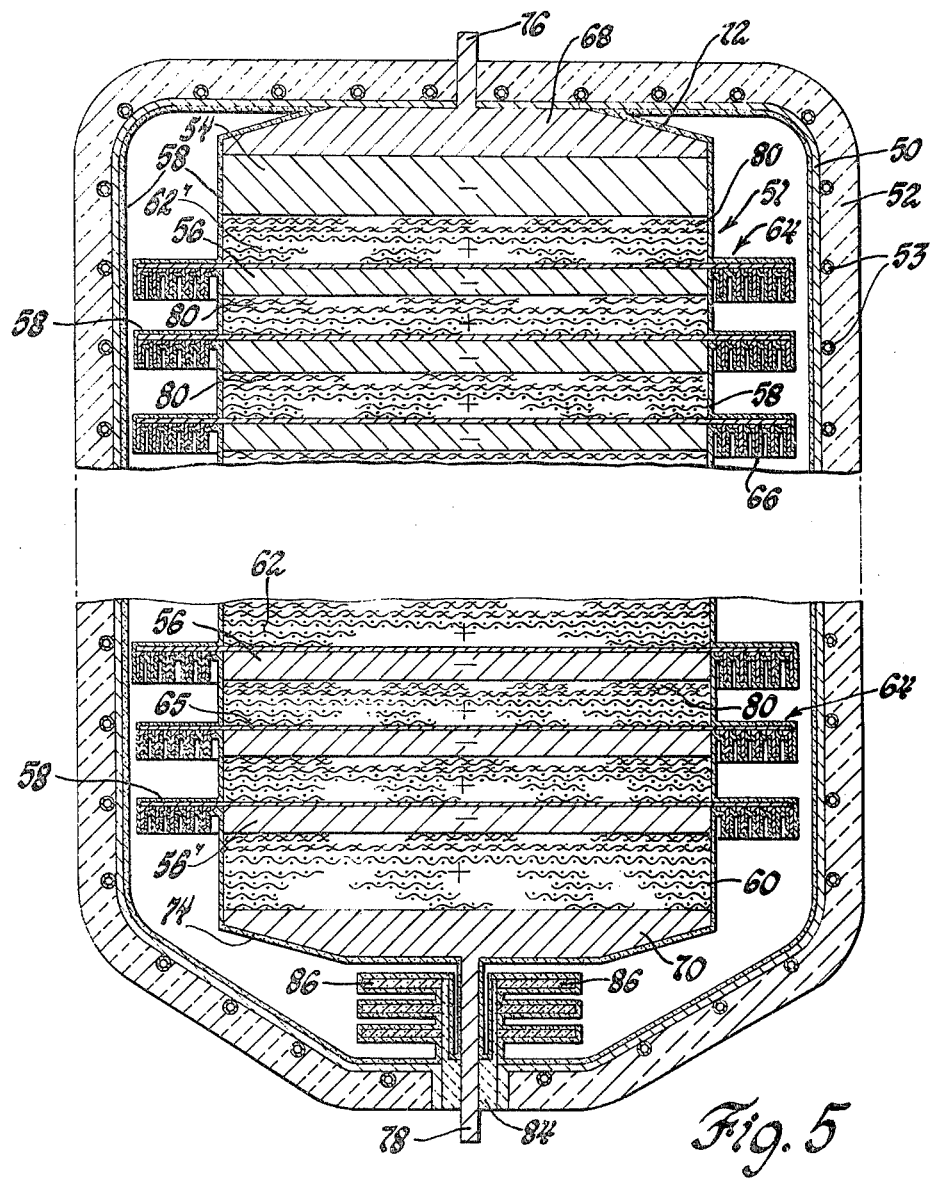
FIG. 5 illustrates a sectioned, side elevational view of a multicell, bipolar Li-FeS$_2$ battery in a sealed housing and made according to the invention hereof.
Figure 6:
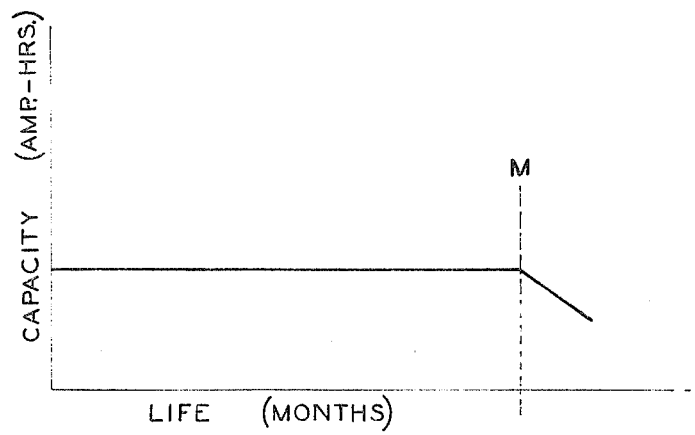
FIG. 6 depicts an ideal performance curve illustrating capacity maintenance prior to depletion of the excess capacity of the end electrodes.

FIG. 5 illustrates a multicell, bipolar, lithium-iron disulfide battery housed in a hermetically sealed container. A metallic (e.g., stainless steel) container 50 houses the cell stack 51 and is itself encased in thermal insulating material 52. Heating elements 53 embedded in the material 52 facilitate heat up and temperature control of the battery. The negative electrode 54 at the upper end of the battery has more lithium capacity than the negative electrodes 56 in the other cells, and hence, is capable of accumulating excess lithium during the life of the battery, and transferred there from the other end of the cell through the electrolyte film 58. Similarly, the positive electrode 60 at the lower end of the battery has greater lithium capacity (i.e., as $Li_2S$) than the other positive electrodes 62 in the other cells. Hence, the positive and negative electrodes 62 and 56 of the intermediate cells are in substantial stoichiometric balance with each other, and their capacities are substantially equal to the capacity of the smaller electrodes 56' and 62' in the end cells. Only the end electrodes 54 and 60 have capacities greater than the other electrodes and then only by an amount sufficent to meet the mission requirements of the battery as affected by the surface loss rate. With the excess lithium capacity in these end electrodes, the battery may be cycled (i.e., charged and discharged) repeatedly without any significant loss of capacity (see FIG. 6) until the excess has transferred from electrode 60 to electrode 54 (see point M on FIG. 6) after which the capacity will degrade as lithium from electrode 56' of the end cell transfers out of that cell toward the other end of the battery.

In the particular embodiment shown in FIG. 5, the barrier 64 comprises a single impermeable sheet having a plurality of annular fins 66 depending therefrom on the peripheral portion thereof outboard the cells' reactive innards. Such a barrier may conveniently be fabricated similarly to FIG. 2 by simply winding a fin-forming strip in spiral fashion and bonding it to the peripheral portion of the sheet 65. This is quite conveniently accomplished by winding the fin-forming strip along with a strip of teflon to act as a spacer between the fins. After bonding the fins to the sheet, the teflon spacer strip is removed and a dense, but spaced, array of fins 66 results. Metal plates 68 and 70 contact the end faces of negative and positive electrodes 54–60 of the end cells, gather current therefrom, and conduct it to the battery terminals 76 and 78. The plates are conveniently tapered as at 72 and 74, respectively. Electrolyte is capillarily immobilized in the zones 80 between the positive and negative electrodes of each cell essentially as described in conjunction with FIG. 1.

The housing 50 is filled with an atmosphere which is inert (e.g., nitrogen, argon, helium, etc.) to the cell's reactants, electrolyte and materials of construction. The electrolyte film 58 is not confined to the external surfaces of the cell stack but, in fact, tends to cover the entire inside surfaces of the battery including the housing 50. To eliminate shorting and reduce self-discharging through the film 58 on the inside walls of the housing 50, the terminal 78 leading from the lower end cell is electrically insulated from the housing 50 by means of ceramic insert 84. The insert 84, like the peripheral portions of the intercell barrier 64, is provided with a plurality of fins 86 to extend the length of the electrolyte film 58 thereover, and hence, increase its resistance to ion flow in substantially the same manner as it does for the peripheral portions of the barrier 64.

To illustrate the principal of reducing surface losses by increasing the length of the electrolyte film around the periphery of the barrier, several two-cell batteries were built substantially as illustrated in FIG. 1, but with varying film lengths produced by varying the number (i.e., one, two and six) of fins at the periphery. Grafoil discs (i.e., 0.25 mm thick) having two different diameters were stacked together in such a way as to produce barriers having one, two and six fins. The larger discs were 2.4 cm greater than the diameter of the cells (i.e., about 2.5 cm). The single fin barrier used a single disc of Grafoil. The two-fin barrier used two such Grafoil discs separated by molybdenum foil circumscribed by a ring of BN fibers. The six-fin barrier was substantially as shown in FIG. 1 where the fin discs were 5.03 cm in diameter and the separator discs (four between fins) were 2.69 cm diameter. There molybdenum discs (2.29 cm diameter) were interspaced between the Grafoil discs and all were bonded together with carbon cement.

Batteries with the one and two fin barriers were constructed from circular porous electrodes, the porosity being provided to provide electrolyte capacity and access to the active materials (positive and negative). The thickness of both electrodes was fixed at the periphery so that axial loading could be used to seal the positive electrode against loss of active material. A dense graphite outer ring around the positive electrode was sealed by being pressed against the separator at the front edge and against a Grafoil disc in back. The negative electrode was contained in a shallow cup pressed from 0.05 mm thick stainless steel sheet. The working face of the electrode had an area of 5.07 cm$^2$ and was covered with 150 mesh stainless steel screen which was secured secured by crimping around the cup flange. In one of the batteries, this flange was bent towards the separator to insure concentricity of the electrodes.

The active material for the negative electrodes of one of the batteries was 0.793 g/cell of 60 atomic percent Li-Al alloy obtained from Foote Mineral Co. and ground to give a particle size range of 30 to 105 mesh. The cells of one of the other batteries were given increased tolerance to overcharging by using 1.079 g/cell of similarily prepared 50 atomic percent Li-Al alloy. The design capacity of these electrodes was 2.61 kC (0.725 A·H) at 85% utilization, corresponding to a theroretical capacity of 3.07 kC (0.853 A·h) or 0.605 kC/cm$^2$(0.168 A·h/cm$^2$).

The positive electrode had an area of 5.07 cm$^2$ and consisted of an outer ring of AXF dense graphite (Poco Carbon Co.) to fix the diameter and the thickness of the electrode. The barrier served as the back surface of the electrode. The active material, 1.079 g/cell of commercial grade FeS$_2$ was purified by flotation in Meriam No. 3 fluid (to remove silica) and ground to a fine powder. It was contained in a disc of carbon felt which also served to stabilize the thickness of the separator. The design capacity of this electrode was 2.61 kC (0.725 A·h) at 75% utilization which corresponds to a theoretical capacity of 3.48 kC (0.968 A·h) or 0.688 kC/cm$^2$ (0.191 A·h/cm$^2$).

The separator was a felt pad of BN fibers having a thickness of 0.5 mm to 1.0 mm when compressed between the electrodes. The electrolyte, selected for its high conductivity and stability with lithium, was 23.0 mol percent LiF-28.6 mol percent LiCl-48.4 mol percent LiBr. The melting point of this mixture was approximately 450° C. It was prepared by dissolving high-purity optical grade LiF in a mixture of 99.6% pure LiCl and 99.0% pure LiBr which was purified by chlorination.

The cells were vacuum impregnated with molten electrolyte in a furnace well of a helium atmosphere glove box. The electrolyte was contained in a vitreous carbon cup to prevent corrosion while in contact with the impregnation fixture at positive electrode potential. The cup was held in a quartz vessel having an aluminum lid. The lid was sealed to the vessel by a silicone rubber gasket and thermally insulated by three stainless steel baffles. Impregnation was accomplished by immersing each cell in molten electrolyte at 525° C. and gradually reducing the pressure to about 10$^4$ μm. After bubbling subsided, the vacuum was released and the cell was removed from the hot zone slowly to minimize thermal shock and to permit drainage of excess electrolyte. The batteries were prepared in the helium-atmosphere glove box, and were operated at 500° C. ±10° C. Nominal operation consisted of charge/discharge cycles at constant current density (40 mA/cm$^2$) controlled by an automatic cycler. Preset voltage limits for each cell (1.9 V maximum, 0.8 V minimum) determined the charge/discharge time. Charge balance was periodically adjusted by manual operation of individual cells.

The rate of surface loss was calculatedfrom cycle-to-cycle changes in negative electrode composition. These changes were indicated by variations in the spacing of sharp changes of slope in the constant-current discharge curves of cell voltage vs. time.

The battery with the six-fin barrier had square porous electrodes (i.e., 6.45 cm$^2$), and, when fully charged, was of the type:

| LiAl | LiF | - | LiCl | - | LiBr | FeS$_2$ |
|------|-----|---|------|---|------|---------|
| (48 a/o) | (27.5 m/o) | | (55.5 m/o) | | (17.0 m/o) | |

They were assembled in the discharged state and operated in a horizontal orientation with the negative electrode on top. Thin-wall graphite rings were embedded in the positive active material to keep the thickness constant at the center of the electrode. The negative active material was divided into 16 square segments which were encased in a woven matrix of 400 mesh stainless steel screen.

The barrier has six Grafoil fins having an external path length between the barrier-contiguous electrodes of 14.9 cm. The Grafoil and molybdenum discs were cemented together (Union Carbide C-34) and cured in air for 14.4 ks at 100° C., and 58 ks at 135° C. This was followed by baking under a vacuum of 1.6 Pa for 43 ks at 550° C.

The battery was operated at 505° C. ± 5° C. in a furnace well attached to a helium atmosphere glove box. Typical operation consisted of charge/dishcarge cycles at constant current density (15 mA/cm$^2$) controlled by an automatic cycler. Preset voltage limits for each cell (2.05 V maximum, 0.90 V minimum) determined the charge/discharge time. During the first 0.88 Ms of operation, charge balance was periodically adjusted by manual operation of the cells individually. Later, the balance was continuously adjusted by applying an increment of constant charging current to the less efficient cell. To maintain a typical voltage pattern while cycling, the charging current was increased and the discharging current was decreased during the later stages of the test. By the end of the test, the charging current density had increased to62 mA/cm$^2$, and the discharging current had decreased to zero. Upon reaching 5.34 Ms (i.e., 1482 hours) of operation in 259 cycles, the battery was removed from test and disassembled. The separators of both cells were replaced with new separators of BN cloth which had been vacuum-impregnated with electrolyte. Each cell was then operated individually for several cycles to determine its lithium content. The resultant data were used to calculate the total shift of lithium from the bottom cell to the top cell. Dividing this value by the total operating time of the battery gave an average rate of lithium transfer.

These tests showed that the surface loss rate corresponding to the rate of lithium transfer around the periphery of the barrier and between the barrier-contiguous electrodes varied inversely with the length of the path between those electrodes around the barrier. Moreover, it was observed that the six-fin barrier held the surface loss rate to about 0.05 mA/cm of cell periphery (i.e., 11.69 cm) which is considered to be much less than is analytically projected (i.e., about 0.4 mA/cm) as being acceptable for a practical battery of this type.

The concepts of extending the intercell electrolyte film to reduce the surface losses and providing excess reactant capacities in the batteries end electrodes to accommodate the surface losses for a predetermined duration are not confined to the Li-FeS$_2$ batteries. Rather, they are applicable to other battery systems as well. For example, they are applicable to ambient temperature, aqueous electrolyte systems such as nickel-zinc alkaline batteries (i.e., NiOOH/KOH/Zn) which discharge according to the following reaction:

$$2NiOOH + H_2O + Zn \rightleftharpoons 2 Ni(OH)_2 + XZnO$$

In such a system, the positive electrode at the positive end of the battery has, in the discharged state, more Ni(OH)$_2$ than the positive electrodes intermediate to the end electrodes and the negative end electrode has, in the discharged state, more ZnO and H$_2$O than the negative electrodes intermediate to the end electrodes. This may be accomplished by simply having larger positive and negative end electrodes, which have the same density as the intermediate electrodes. On the other hand, the end electrodes may be made denser than the intermediate electrodes without any size change. Combinations of size and density differences may also be used to achieve the desired results. Like the Li-FeS$_2$ system, the electrolyte floods the porous electrodes and is capillarily immobilized between the electrodes by means of a wetted matrix, mat or the like. Appropriate zinc-dendrite-suppressing separators would also be required as is well known in the art. Intercell barriers for such aqueous systems may conveniently be made from such conductive materials as Grafoil or nickel. Moreover, the peripheral portions thereof could well be coated with such materials as teflon or the like which, due to its resistance to wetting, tends to reduce the thickness, and hence, the conductivity of any electrolyte film formed thereon.

While this invention has been described in terms of specific examples thereof, it is not intended that it be limited thereto, but rather only to the extent set forth hereafter in the claims which follow.

The embodiments of the invention in which an exclusive property or privilege is claimed are defined as follows:

1. A secondary bipolar battery comprising:
   a plurality of galvanic cells in contiguous end-to-end relation one to the other and together defining a cell stack having a positive polarity end and a negative polarity end;
   said cells each comprising a first electrode containing positive reactant, a second electrode containing negative reactant and an electrolyte physically separating, but ionically communicating said electrodes, said electrolyte being substantially immobilized in the region between said electrodes;
   a positive end electrode at said positive polarity end;
   a negative end electrode at said negative polarity end;
   intermediate positive and negative electrodes arranged between said positive and negative end electrodes such as to form said cells, said intermediate electrodes each containing a predetermined quantity of positive or negative reactant as appropriate to the design capacity of the battery;
   an electrically conductive, impermeable barrier contiguously interjacent the positive and negative electrodes of adjacent cells in said stack and adapted to conduct electrical current between the electrodes contiguous said barrier while concurrently preventing direct chemical or electrochemical action therebetween through said barrier;
   said barrier having a tortuously-pathed peripheral portion extending outboard the perimeters of said barrier-contiguous electrodes for reducing unwanted parasitic ionic current flow between said barrier-contiguous electrodes incident to the formation of a film of said electrolyte over the surface of said stack and between said barrier-contiguous electrodes, said portion serving to elongate the path length between said barrier-contiguous electrodes through said film;
   said positive and negative end electrodes each containing a quantity of reactant greater than said predetermined quantity in intermediate electrodes of the same polarity, said greater quantity being such as to compensate for reactant losses attributable to said parasitic current flow and thereby to substantially retain said capacity for prolonged periods; and
   a housing enclosing said stack and adapted to contain an atmosphere around said stack which is substantially nonreactive to the cells' reactants, electrolyte and materials of construction.

2. A secondary bipolar battery comprising:
   a plurality of galvanic cells in contiguous end-to-end relation one to the other and together defining a cell stack having a positive polarity end and a negative polarity end;
   said cells each comprising a first electrode containing positive reactant, a second electrode containing negative reactant and an electrolyte physically separating, but ionically communicating said electrodes, said electrolyte being substantially immobilized in the region between said electrodes;
   a positive end electrode at said positive polarity end;
   a negative end electrode at said negative polarity end;
   intermediate positive and negative electrodes arranged between said positive and negative end electrodes such as to form said cells, said intermediate electrodes each containing a predetermined quantity of positive or negative reactant as appropriate to the design capacity of the battery;
   an electrically conductive, impermeable barrier contiguously interjacent the positive and negative electrodes of adjacent cells in said stack and adapted to conduct electrical current between the electrodes contiguous said barrier while concurrently preventing direct chemical or electrochemical action therebetween through said barrier;
   said barrier having a peripheral portion including a plurality of annular fins outboard the perimeters of said barrier-contiguous electrodes for reducing unwanted parasitic ionic current flow between said barrier-contiguous electrodes incident to the formation of a film of said electrolyte over the surface of said stack and between said barrier-contiguous electrodes, said portion serving to elongate the path length between said barrier-contiguous electrodes through said film;

said positive and negative end electrodes each containing a quantity of reactant greater than said predetermined quantity in intermediate electrodes of the same polarity, said greater quantity being such as to compensate for reactant losses attributable to said parasitic current flow and thereby to substantially retain said capacity for prolonged periods; and a housing enclosing said stack and adapted to contain an atmosphere around said stack which is substantially nonreactive to the cells' reactants, electrolyte and materials of construction.

3. A secondary bipolar battery comprising:

a plurality of galvanic cells in contiguous end-to-end relation one to the other and together defining a cell stack having a positive polarity end and a negative polarity end;

said cells each comprising a first electrode containing positive reactant, a second electrode containing negative reactant and an electrolyte physically separating, but ionically communicating said electrodes, said electrolyte being substantially immobilized in the region between said electrodes;

a positive end electrode at said positive polarity end;

a negative end electrode at said negative polarity end;

intermediate positive and negative electrodes arranged between said positive and negative end electrodes such as to form said cells, said intermediate electrodes each containing a predetermined quantity of positive or negative reactant as appropriate to the design capacity of the battery;

an electrically conductive, impermeable barrier contiguously interjacent the positive and negative electrodes of adjacent cells in said stack and adapted to conduct electrical current between the electrodes contiguous said barrier while concurrently preventing direct chemical or electrochemical action therebetween through said barrier;

said barrier having a substantially planar peripheral portion extending outboard the perimeter of said barrier-contiguous electrodes and including a plurality of annular fins depending from said portion for reducing unwanted parasitic ionic current flow between said barrier-contiguous electrodes incident to the formation of a film of said electrolyte over the surface of said stack and between said barrier-contiguous electrodes, said portion serving to elongate the path length between said barrier-contiguous electrodes through said film;

said positive and negative end electrodes each containing a quantity of reactant greater than said predetermined quantity in intermediate electrodes of the same polarity, said greater quantity being such as to compensate for reactant losses attributable to said parasitic ionic current flow and thereby to substantially retain said capacity for prolonged periods; and a housing enclosing said stack and adapted to contain an atmosphere around said stack which is substantially nonreactive to the cells' reactants, electrolyte and materials of construction.

4. A high temperature, secondary, bipolar battery comprising:

a plurality of galvanic cells in contiguous end-to-end relation one to the other and together defining a cell stack having a positive polarity end and a negative polarity end;

said cells each comprising a first electrode containing a metal sulfide positive reactant, a second electrode containing a lithium negative reactant and a fused salt electrolyte physically separating, but ionically communicating said electrodes, said electrolyte being substantially immobilized in the region between said electrodes;

a positive end electrode at said positive polarity end;

a negative electrode at said negative polarity end;

intermediate positive and negative electrodes arranged between said positive and negative end electrodes such as to form said cells, said intermediate electrodes each containing a predetermined quantity of positive or negative reactant as appropriate to the design capacity of the battery;

an electrically conductive, impermeable barrier contiguously interjacent the positive and negative electrodes of adjacent cells in said stack and adapted to conduct electrical current between the electrodes contiguous said barrier while concurrently preventing direct chemical or electrochemical action therebetween through said barrier;

said barrier having a peripheral portion including a plurality of annular fins outboard the perimeters of said barrier-contiguous electrodes for reducing unwanted parasitic ionic current flow between said barrier-contiguous electrodes incident to the formation of a film of said electrolyte over the surface of said stack and between said barrier-contiguous electrodes, said portion serving to elongate the path length between said barrier-contiguous electrodes through said film;

said positive and negative end electrodes each containing a quantity of reactant greater than said predetermined quantity in intermediate electrodes of the same polarity, said greater quantity being such as to compensate for reactant losses attributable to said parasitic current flow and thereby to substantially retain said capacity for prolonged periods; and a housing enclosing said stack and adapted to contain an atmosphere around said stack which is substantially nonreactive to the cells' reactants, electrolyte and materials of construction.

5. A secondary bipolar battery comprising:

a plurality of galvanic cells in contiguous end-to-end relation one to the other and together defining a cell stack having a positive polarity end and a negative polarity end;

said cells each comprising a first electrode containing positive reactant, a second electrode containing negative reactant and an electrolyte physically separating, but ionically communicating said electrodes, said electrolyte being substantially immobilized in the region between said electrodes;

a positive end electrode at said positive polarity end;

a negative end electrode at said negative polarity end;

intermediate positive and negative electrodes arranged between said positive and negative end electrodes such as to form said cells, said intermediate electrodes each containing a predetermined quantity of positive or negative reactant as appropriate to the design capacity of the battery;

an electrically conductive, impermeable barrier contiguously interjacent the positive and negative electrodes of adjacent cells in said stack and adapted to conduct electrical current between the electrodes contiguous said barrier while concurrently preventing direct chemical or electrochemical action therebetween through said barrier;

said barrier having a tortuously-pathed peripheral portion extending outboard the perimeters of said barrier-contiguous electrodes for reducing unwanted parasitic ionic current flow between said barrier-contiguous electrodes incident to the formation of a film of said electrolyte over the surface of said stack and between said barrier-contiguous electrodes, said portion serving to elongate the electrical path length between said barrier-contiguous electrodes through said film;

said positive and negative end electrodes each containing a quantity of reactant greater than said predetermined quantity in intermediate electrodes of the same polarity, said greater quantity being such as to compensate for reactant losses attributable to said parasitic current flow and thereby to substantially retain said capacity for prolonged periods; and a housing enclosing said stack and adapted to contain an atmosphere around said stack which is substantially nonreactive to the cells' reactants, electrolyte and materials of construction;

a conductive terminal for conducting current generated within said stack out of said housing; and insulator means surrounding said terminal and electrically insulating said terminal from said housing, said insulator means extending into said housing and thereon including a plurality of fins radially outboard said terminal for reducing unwanted parasitic ionic current flow between said end electrodes incident to the formation of a film of said electrolyte over the inner surface of said housing, said fins on said insulator serving to elongate the ionic path length between said end electrodes through said film.

* * * * *

UNITED STATES PATENT AND TRADEMARK OFFICE
CERTIFICATE OF CORRECTION

PATENT NO. : 4,208,473
DATED : June 17, 1980
INVENTOR(S) : Thompson G. Bradley

It is certified that error appears in the above-identified patent and that said Letters Patent are hereby corrected as shown below:

Column 7, line 3, "There" should read -- Three --.

Column 7, line 31, the material within the parentheses which now reads "0.725 A·H" should read -- 0.725 A·h --.

Column 8, lines 20-24 - chart, the two exterior columns on the far right and left sides should be separated from the three middle columns by vertical lines.

Column 9, lines 22-24, the formula now reads "2NiOOH+$H_2$O+Zn $\leftrightarrows$ 2 Ni(OH)$_2$+XZnO". It should read as follows:

-- 2NiOOH + $H_2$O + Zn $\rightleftarrows$ 2 Ni(OH)$_2$ + ZnO --.

Signed and Sealed this

Ninth Day of December 1980

[SEAL]

*Attest:*

*Attesting Officer*

SIDNEY A. DIAMOND

*Commissioner of Patents and Trademarks*